United States Patent [19]

Langewis

[11] 3,745,633
[45] July 17, 1973

[54] METAL PRESS
[75] Inventor: Cornelis Langewis, Walnut Creek, Calif.
[73] Assignee: Kaiser Aluminum & Chemical Corporation, Oakland, Calif.
[22] Filed: Dec. 6, 1971
[21] Appl. No.: 205,145

[52] U.S. Cl.................... 29/200 B, 29/517, 72/402
[51] Int. Cl....................... B23p 19/00, B23p 11/00
[58] Field of Search ........................ 29/200 B, 517; 72/402

[56] References Cited
UNITED STATES PATENTS
1,057,159  3/1913  Madsen................................ 29/446
2,064,129  12/1936  Temple, Jr............................ 29/517
3,373,474  3/1968  Doerer............................... 29/200 B
3,511,075  5/1970  Boggio et al......................... 72/402

Primary Examiner—Thomas H. Eager
Attorney—Paul E. Calrow

[57] ABSTRACT

An apparatus particularly suited for securing a sleeve of substantial thickness such as a hollow core sacrificial anode to a metal pipe, comprising a cylindrical housing having a pressure activated piston and piston rod, the piston rod being aligned to exert pressure through a hydraulically-filled chamber on a movable piston. A die mounted in the center of the movable piston cooperates with a die mounted in a fixed platen to compress a metal sleeve around a metal pipe.

4 Claims, 3 Drawing Figures

3,745,633 dictions# METAL PRESS

CROSS-REFERENCE TO RELATED APPLICATION

In U.S. application Ser. No. 138,969, filed Apr. 30, 1971, said application and the instant application having a common assignee, a particularly useful product which can be made by the apparatus set forth herein is disclosed.

BACKGROUND OF THE INVENTION

The invention is directed to a novel apparatus for securely compressing a metal sleeve around a length of pipe. It is particularly useful in joining a hollow core magnesium anode to a length of pipe which can be used as a gas riser.

Numerous methods have been used to secure metal sleeves to metal pipes. Besides welding, soldering, etc., sleeves have been compressed by means of pistons which are explosively activated as in U.S. Pat. No. 2,064,129. U.S. Pat. No. 1,057,159 uses the principal of subjecting a member to mechanical strain, placing one member inside another, and releasing the mechanical strain by heating the members. U.S. Pat. No. 3,511,075 sets forth a method for securing a sleeve to core means such as a multi-strand cable. Unlike the present invention, the core runs through the length of the housing and through the center of the piston; there are other significant differences between the patented apparatus and the present invention.

SUMMARY OF THE INVENTION

The present invention is directed to a method and apparatus for securing a metal sleeve to a metal core. The invention is particularly adapted to secure a hollow core magnesium anode to a length of pipe such as pipe used in conducting gas from a street main to a residential or industrial unit. The apparatus comprises a hydraulic piston having a die mounted in its top face to reciprocate with a die in a fixed platen mounted in opposed relationship thereto. The hydraulic piston is activated by the upward thrust of a piston rod mounted on an air activated piston. The apparatus contains means to force both the hydraulic and air activated pistons downwardly when the air pressure on the air activated piston is reduced substantially to atmospheric pressure.

DETAILED DESCRIPTION

Figure 1:
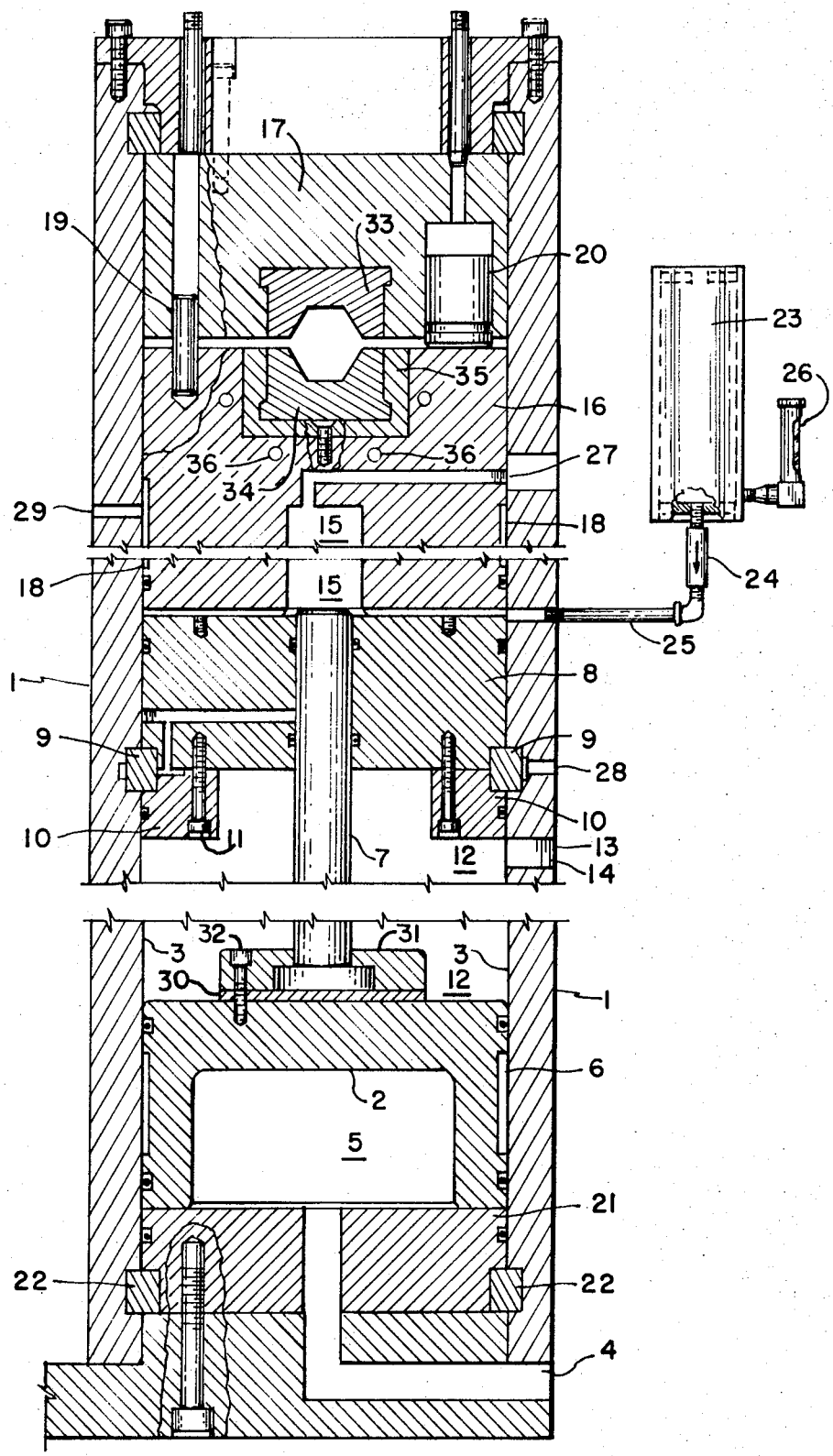
FIG. 1 is a fragmented cross-sectional view of an embodiment of an apparatus according to the invention.

The invention will be described by reference to the embodiment in FIG. 1 which depicts in cross-section an apparatus for compressing a sleeve of metal, such as a magnesium anode, around a length of pipe such as a gas riser. Housing 1 has mounted therein air pressure activated piston 2. The circumference of piston 2 is slidably mounted with respect to internal wall 3 of housing 1. Air pressure, e.g. 60 psi, from an external source, not shown, is transmitted through conduit 4 to chamber 5. As air pressure in chamber 5 is increased, it forces piston 2 upward along internal walls 3. Upward movement of piston 2 is facilitated by means of sleeve 6, which is made of material having low coefficient of friction, such as tin-aluminum alloy.

Upward movement of piston 2 forces piston rod 7 upward through stationary collar 8, which is mounted on split lock ring 9, thus preventing downward movement of collar 8. Ring 10 is mounted on the opposing side of lock ring 9 and is secured to collar 9 through screws 11, thus preventing upward movement of collar 8. Air pressure in chamber 12 is maintained at atmospheric level by means of air vent 13, which preferably will contain screen 14, or other device, to prevent dirt or other foreign objects from entering chamber 12.

In a preferred embodiment, low positive air pressure, e.g. 5 psi, is maintained in chamber 12 by an external pressure source, not shown, through vent 13. This facilitates fast return of piston 2 when pressure in chamber 5 is released, but it does not interfere with the working of press when pressure is applied in chamber 5.

As piston rod 7 is forced upward, it freely enters oil-filled chamber 15, thus transmitting pressure to piston 16 and forcing it upward against stationary platen 17. Friction between piston 16 and housing 1 is reduced by recess 18 around the circumference of piston 16. The upward movement of piston 16 is kept in alignment by means of dowel pin 19, and the upward movement of piston 16 causes piston 20 to recede partially into stationary platen 17.

When air pressure in chamber 5 is released, air pressure introduced into the cylinder bore for piston 20 forces piston 20 against the top face of piston 16 and thus forces piston 16 toward the bottom. The downward movement of piston 16 transmits pressure through the fluid in chamber 15 against piston rod 7 and piston 2, forcing them to the bottom until piston 2 abuts against immovable base 21 which is mounted on split lock ring 22. In a preferred embodiment, piston 20 is maintained with a positive air pressure which is inadequate to interfere with the upward movement of piston 16 when air pressure is applied to chamber 5 but is adequate to force the movable parts downward when air pressure in chamber 5 is reduced to atmospheric.

The oil level in chamber 15 is maintained from reservoir 23 through check valve 24 and conduit 25. Check valve 24 is designed to prevent escape of fluid back into reservoir 23. Eyeglass 26 is used to monitor the oil level in reservoir 23.

The top of chamber 15 is provided with air bleed 27 which is used when filling or emptying chamber 15. In addition, housing 1 is provided with vents 28 and 29 to bleed off oil that escapes from chamber 15 and the space between stationary collar 8 and piston 16 along the circumferences of said collar and piston. Vent 28 is also used to bleed off air that excapes from chamber 12 along the circumferences of rod 7 and collar 8. Air bleed system is partially shown in block 8.

In a preferred embodiment, piston 2 and piston 16 are made from lightweight metal, such as aluminum; housing 1, base 21, piston rod 7 and stationary collar 8 and platen 17 are made from steel. When aluminum is used for these major moving parts, the efficiency of the press is increased. It is, however, then advisable to interpose steel plate 30 between piston rod 7 and piston 2 to disperse the pressure more evenly. Steel collar 31 and screw 32 are employed to secure the piston 2 and piston rod 7 together.

The top face of piston 16 and bottom face of platen 17 are provided with dies 33 and 34. A steel holder 35 is mounted in piston 16 to hold die 34 in opposed relationship to die 33. Water-cooling means 36 are spaced in piston 16 around holder 35.

Figure 3:
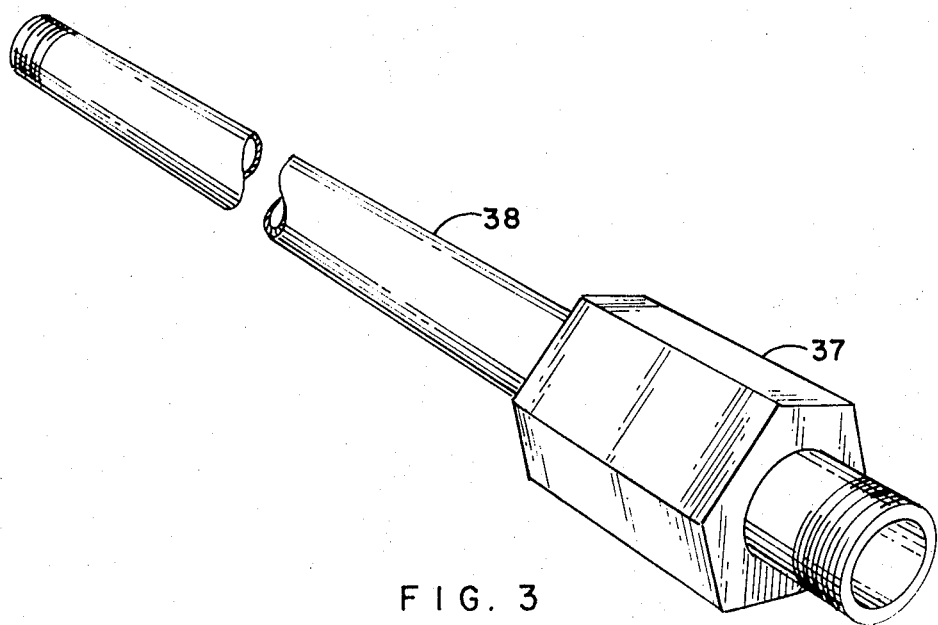
FIG. 3 is a fragmented perspective view of anode-pipe product depicted in cross-section in FIG. 2.
Figure 2:
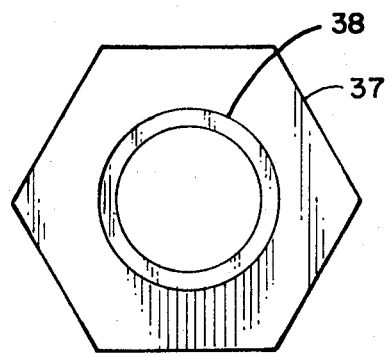
FIG. 2 is a cross-sectional view of a hexagonal magnesium anode secured to a length of pipe according to the present invention.

By way of example, the use of the apparatus will be described with respect to securing a magnesium anode around a length of pipe as shown in FIGS. 2 and 3. Magnesium anode 37 has, when heated, substantially the same cross-section as that defined by the hexagonal opening between dies 33 and 34 in the open position; it also has a length that does not exceed the corresponding length of the dies. The anode is heated by any convenient means to a temperature between approximately 350° to 500°F. It is then slipped over pipe 38 and the assembly is placed between dies 33 and 34 so that anode 37 is encompassed by said dies. Air pressure is introduced into chamber 5, thus activating the press and causing the movable parts to move upward as previously described. The upward movement of die 34 thus exerts pressure against the lower three faces of anode 37 while die 33 exerts pressure against the upper three faces of anode 37 forcing the anode to be crimped about pipe 38. Pressure is then removed from chamber 5 and the movable parts move downwardly as previously described. In practice, anode 37 will substantially fill the void formed by dies 33 and 34 to insure that equal pressure is brought against all faces of anode 37. As a practical matter, piston 16 in its upward movement will not abut against the lower face of fixed platen 17, and the pressure applied against anode 37 is less than that which would cause deformation of the anode into the horizontal space between piston 16 and fixed platen 17.

Although the invention has been described with respect to hexagonal magnesium anodes, the use of the apparatus for anodes of different cross-section or for other purposes is readily apparent.

I claim

1. Apparatus for securing a circumferentially closed metal sleeve on an elongated, cylindrical member comprising a cylindrical housing having mounted therein a pressure activated piston, piston rod mounted on the head of said piston, said rod having a cross-sectional area from about one twenty-fifth to one-sixtieth of the cross-sectional area of said piston, piston rod guide means mounted in said housing substantially around the upper end of said piston rod, a lower movable piston having a hydraulically-filled chamber disposed in axial alignment with said piston rod and having a diameter such that said chamber freely receives said piston rod, an upper fixed platen opposed to said movable piston, said movable piston and said fixed platen having opposing dies mounted therein substantially in alignment with the center of said piston rod and being spaced apart from each other a distance that is slightly in excess of one twenty-fifth to one-sixtieth the distance said piston rod travels, means mounted in said fixed platen and in opposed relationship to said movable piston to force said movable piston downwardly when said piston is inactivated.

2. An apparatus according to claim 1 wherein said means mounted in said fixed platen is a constant air pressure-activated cylinder, the pressure being a small fraction of the pressure used to activate the piston.

3. An apparatus according to claim 1 wherein the said hydraulically-filled chamber is in communication with a fluid reservoir mounted externally to said housing, said reservoir being adapted to maintain a constant fluid level in said chamber and to prevent return of fluid from said chamber to said reservoir.

4. An apparatus according to claim 1 wherein said pressure activated piston is subject to a constant air pressure to force said piston to the bottom when said piston is activated.

* * * * *